No. 12,139. REISSUED AUG. 4, 1903.

F. E. SLOAN.

FRICTION HINGE.

APPLICATION FILED APR. 17, 1903.

Inventor

F. E. Sloan.

Witnesses

J. W. Wheeler.

By

Stewart & Stewart

Attorneys

No. 12,139. Reissued August 4, 1903.

UNITED STATES PATENT OFFICE.

FRANCIS EUGENE SLOAN, OF BALTIMORE, MARYLAND.

FRICTION-HINGE.

SPECIFICATION forming part of Reissued Letters Patent No. 12,139, dated August 4, 1903.

Original No. 714,959, dated December 2, 1902. Application for reissue filed April 17, 1903. Serial No. 153,120.

*To all whom it may concern:*

Be it known that I, FRANCIS EUGENE SLOAN, a citizen of the United States of America, and a resident of 10 South Charles street, Baltimore, Maryland, have invented certain new and useful Improvements in Friction-Hinges, of which the following is a specification.

This invention relates to improvements in friction-hinges, and is designed more especially for supporting mirrors and the like.

In mounting mirrors to swing in supporting-frames a hinge is required which is strong, neat, cheap, and so constructed as to move with sufficient friction to hold the mirror at any desired angle at which it may be set. All hinges heretofore made have required the use of screws for attaching and maintaining the desired friction. In practice the screws are expensive, require time to set, and are liable to become displaced. In my invention the hinge requires the use of no screws. It is seated in slots made in the frame and supports when they are being manufactured, is attached without the use of screws and cannot become detached, and withal maintains the desired amount of friction to hold the mirror at any desired angle.

It is therefore my purpose to construct a friction-hinge having resilient pintle-holders and wings located at an angle to each other and to seat the wings in undercut slots in the two members which are to be united. The wings being resilient may be pressed upon the pintle either by confinement in slots smaller than the wings or the pintle-holder may be primarily compressed upon the pintle to create the desired friction, and the slot may be of the same size or larger than the wings. The wings in both cases will be confined and concealed in the slots and will support the frame upon the standards without the necessity for any further fastening device.

Figure 1:
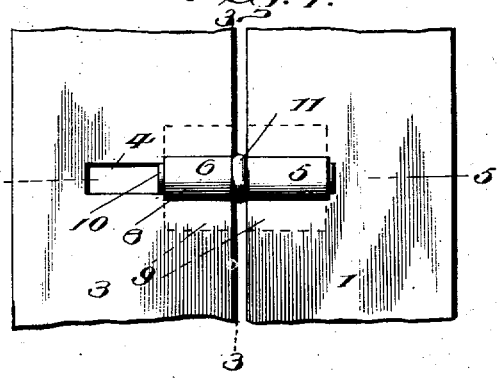
Figure 2:
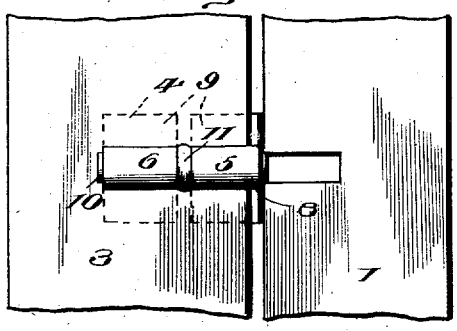
Figure 3:
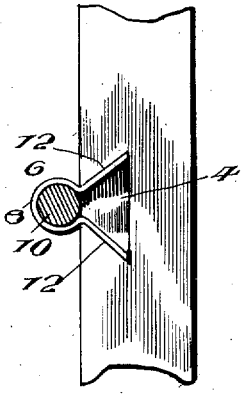
Figure 3:
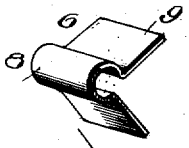
Figure 4:
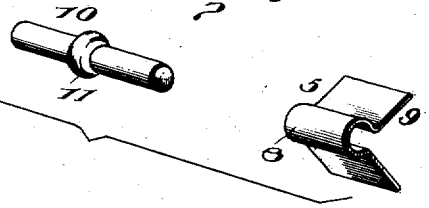
Figure 5:
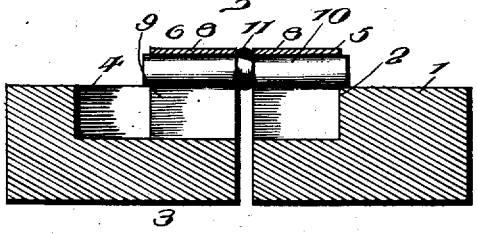
Figure 6:
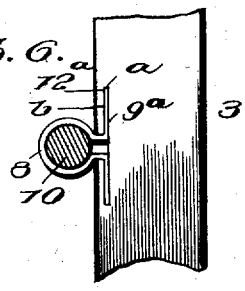
Figure 7:
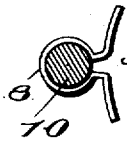

In the drawings, Figure 1 is an elevation of a portion of a mirror-frame and its support having my improved hinge applied. Fig. 2 is a similar view, but showing the manner of applying the hinge. Fig. 3 is a vertical section on the line 3 3 of Fig. 1. Fig. 4 is a perspective view illustrating the parts separated. Fig. 5 is a horizontal section on the line 5 5 of Fig. 1. Figs. 6 and 7 are detail views of a slight modification of my invention.

The numeral 1 represents a mirror-frame of any well-known construction, having an undercut slot 2 in its outer edge. The smaller portion of this slot is open on one of the faces of the frame, while its opposite or wider portion is closed.

3 indicates the stationary supporting-standard, which is provided with an undercut slot 4 of exactly the same configuration and size as the slot 2 in the mirror-frame 1. I have shown the slot 4 approximately twice as long as the slot 2, for a purpose which will be hereinafter described. While I have shown the slot 4 longer, it is to be understood that slot 2 may be thus constructed and the slot 4 made shorter.

5 and 6 represent a pair of pintle-holders adapted to fit in the slots 2 and 4. Each holder is constructed of resilient material and is bent to form a partially-cylindrical socket 8, with two wings 9 extending outwardly therefrom and at an angle to each other. The holders 5 and 6 are mounted on a pintle 10, and an enlargement 11 thereon prevents the pintle from disengagement with the socket when the parts are positioned.

With a hinge thus constructed the mode of assembling and the operation are as follows: The holders 5 and 6 are slipped on each end of the pintle and abut against the enlargement 11, and both holders and pintle are forced into the slot 4. It is to be understood at this point that by reason of the resilient nature of the wings the outward pressure exerted thereby against the undercut walls 12 of the slot creates a frictional grip of the sockets on the pintle and between the wings and the walls 12. The pintle and holders having been driven into the slot 4, the mirror-frame 1 is positioned adjacent its stationary support 3, whereupon the holders are driven along slot 4 until the holder 5 enters its slot 2 and its edge is flush with the side of the frame 1. Both holders being driven together, obviously in positioning and alining the one 5 its companion, 6, will be likewise acted upon, so that, as disclosed in Fig. 1, when the holders are properly adjusted the enlargement also acts as a spacing medium between the two frames to readily permit a free swinging movement of the mirror. The tendency of the wings 9 to expand when they are confined in the slots creates such frictional resistance between the walls 12 and the wings 9 that any liability of the holders becoming displaced is avoided, and, as has been heretofore stated, such frictional resistance also causes the sockets to bind on the pintle, which will allow of the mirror being adjusted to any desired angle, where it will be maintained. In addition to this adjustment the friction between the parts readily takes up the wear. To disengage the parts, the holder 5 is driven out of slot 2 into slot 4 and the mirror is removed.

Hinges acted on by springs to maintain certain parts in position are old in the art; but a hinge constructed of spring metal fitting in undercut slots and positively located without the use of auxiliary fastening devices is new with me. Such a structure enables me to fit and swing one frame within another without any liability of cracking or splitting the latter.

In the modifications disclosed in Figs. 6 and 7 I have shown the walls $12^a$ of the slots vertical. The wings $9^a$ in this structure are disposed at right angles to the pintle and are slightly bowed. When the holders are applied, the wings have practically individual bearing-points—that is to say, the outer ends *a* bear against the walls of the widest part of the slot, while the bow of the wings, although straightened, bears against the vertical walls, as at *b*.

What I claim as new is—

1. As a new article of manufacture, a friction-hinge, comprising a pair of resilient pintle-holders, each holder being bent to form a cylindrical portion and two wings extending at an angle less than one hundred and eighty degrees from the cylindrical portion, for adapting the holders to be held in dovetailed slots, a pintle having an enlargement, the pintle-holders being mounted on the pintle each side of the enlargement, substantially as described.

2. In a friction-hinge, the combination with a pintle, of a pair of pintle-holders, formed of resilient material, and bent at their centers to form sockets for the pintle, each having two wings extending from the socket portion at an angle less than one hundred and eighty degrees, for adapting the wings to be held in undercut slots.

3. In a friction-hinge, the combination with a pintle, of a pair of pintle-holders formed of resilient material and bent at their centers to form sockets for the pintle, each having two wings extending from the socket portion at an angle less than one hundred and eighty degrees, for adapting the wings to be held in undercut slots, two members adapted to be connected by the friction-hinge, the one to be supported by the other, each being provided with an undercut slot into which the pintle-holders are fitted.

4. In a friction-hinge, the combination with a pintle, of a pair of pintle-holders formed of resilient material and bent at their centers to form sockets for the pintle, each having two wings extending from the socket portion at an angle less than one hundred and eighty degrees for adapting the wings to be held in undercut slots, two members adapted to be connected by the friction-hinge, one to be supported by the other, each being provided with an undercut slot into which the pintle-holders are fitted, the pintle-holders being held in place by the wings bearing against the walls of the slots, substantially as described.

5. In a friction-hinge, the combination with a pintle, of a pair of pintle-holders, each bent to form a socket for the pintle, each holder having wings with two members adapted to be connected by the friction-hinge, one to be supported by the other, each member being provided with a slot into which one of the pintle-holders is fitted, one of said slots being longer than the other, to receive both pintle-holders when applying the hinge, substantially as described.

Signed by me at Baltimore city, State of Maryland, this 25th day of March, 1903.

FRANCIS EUGENE SLOAN.

Witnesses:

T. BAYARD WILLIAMS,

W. A. MORGAN.